United States Patent [19]

Derman

[11] Patent Number: 4,986,097

[45] Date of Patent: Jan. 22, 1991

[54] TANK FILLER TUBE LOCK

[76] Inventor: Jay S. Derman, 1201 N. Catalina Ave., P.O. Box 949, Redondo Beach, Calif. 90277

[21] Appl. No.: 550,188

[22] Filed: Jul. 9, 1990

[51] Int. Cl.⁵ ............................................. B65D 55/14
[52] U.S. Cl. .................................... 70/158; 70/163; 70/171; 220/210; 220/253
[58] Field of Search .................. 70/158–173, 70/423–428, 419, 455; 220/210, 253, 254

[56] References Cited

U.S. PATENT DOCUMENTS

| | | | |
|---|---|---|---|
| 2,125,819 | 8/1938 | Schneider | 70/172 X |
| 2,381,207 | 8/1945 | Coleman | 70/171 X |
| 3,206,955 | 9/1965 | Horovitz | 70/163 |
| 3,563,368 | 2/1971 | McHugh | 220/253 X |
| 4,141,461 | 2/1979 | LaChance | 220/253 |
| 4,164,302 | 8/1979 | Gerdes | 70/171 X |
| 4,203,527 | 5/1980 | LaChance, Sr. | 220/253 |
| 4,377,243 | 3/1983 | Shaw et al. | 70/171 X |
| 4,673,813 | 6/1987 | Sanchez | 220/253 X |
| 4,754,627 | 7/1988 | Butler, III | 70/158 |
| 4,899,564 | 2/1990 | Gilbert | 70/428 |

FOREIGN PATENT DOCUMENTS 4492 11/1932 Australia .............................. 70/173

*Primary Examiner*—Gary L. Smith
*Assistant Examiner*—Suzanne L. Dino
*Attorney, Agent, or Firm*—Monty Koslover Assoc.

[57] ABSTRACT

A locking device for tank filler tubes is described, comprising a sleeve member for insertion in the filler tube to provide smooth walls, and an annular shaped locking collar that slides inside the sleeve and fastens through the sleeve to the inside wall of the filler tube. The locking collar does not have to be removed in order to fill the tank. Two disks, having off-center openings large enough for a filler hose nozzle, are arranged one above the other in the top of the locking collar so that the top disk can be rotated to allow the off-center openings to be aligned for a filler nozzle. A cylinder lock prevents rotation of the top disk when in the locked position. An alternative embodiment of the invention does not fit inside the tank filler tube, but rather is welded or joined to it. This alternative uses a padlock which prevents a cap from being rotated to a position which aligns openings in the device, allowing insertion of a filler hose nozzle.

16 Claims, 3 Drawing Sheets

4,986,097

TANK FILLER TUBE LOCK

BACKGROUND OF THE INVENTION

1. Field of the Invention

This invention relates primarily to locking devices for vehicle fuel tanks, particularly for trucks, to prevent fuel theft and tank tampering. The invention also relates to locking devices for stationary tanks and containers which contain fluids.

2. Description of the Prior Art

Locks for vehicle fuel tanks are well known in the art. A typical prior art tank filler cap lock is disclosed by Shaw in U.S. Pat. No. 4,377,243. The lock means is mounted within the cap secured to the tank filler tube. When the lock is actuated, copperating means and a retaining member act against the filler tube to prevent removal of the cap. In order to fill the tank, one must unlock the cap and remove it. A safety chain is provided, attached to the cap to prevent loss of the cap during filling. Another tank closure cap lock is disclosed by Gerdes in U.S. Pat. No. 4,164,302. In this invention, actuation of a cylindrical lock embedded in the center of the cap causes radial bolts to apply pressure against the retaining wall and holds the cap lock in place.

In order to fill the tank, the cap lock must be unlocked and removed. Like the shaw device, this cap lock is exposed to cold weather, allowing the locking mechanism to possibly freeze.

Yet another tank closure cap is illustrated in Rockhill in U.S. Pat. No. 1,964,214. This invention fits over the neck of a tank filler tube and depends on there being a flange or shoulder inside the filler tube, so that bolts actuated by turning a key in the lock will engage the flange, preventing removal of the cap. A hinged cover is attached to cover the top of the cap. As for the prior devices, the cap has to be removed in order to fill the tank. Thus, there exists a need for a tank filler tube locking device that does not require its removal in order to fill the tank; that can be positioned so that it is not exposed to cold climates and can be adapted to any size tank filler tube without modification of the tank filler tube.

SUMMARY OF THE INVENTION

The invention comprises a sleeve member for insertion in the tank filler tube to provide smooth sealable walls, and an annular shaped locking collar which is inserted in the sleeve member and fastened to the sleeve, through its walls to the tank filler tube. The locking collar is not required to be removed in order to fill the tank. Two disks, having off-center openings large enough for a filler nozzle are arranged one above the other in the annular locking collar, so that the top disk can be rotated to allow the off-center openings to be aligned, allowing insertion of a filler nozzle. A cylinder lock is provided and placed to prevent rotation of the top disk from the locked position, presenting a misalignment of the disk openings, effectively blocking the tank pipe from being filled. The locking collar may be located well below the top of the filler tube which can have a separate standard non-locking cover or cap for weather protection. An alternative embodiment of the invention does not utilize a filler tube sleeve, but rather may be fastened or welded to the end of the tank filler or egress tube. As for the first embodiment, a top portion having an off-center opeing is enabled to rotate with respect to a lower portion having an off-set opening, to either align or misalign the openings for use. Provision is made for locking in the misaligned (closed) position.

Accordingly, it is a principal object of this invention to provide a locking device for tank filler tubes that restricts unauthorized entry to the tank, preventing fuel transfer.

Another object is to provide a locking device that is not required to be removed from the tank in order to fill the tank. A further object is to provide a locking device that need not be exposed to cold weather and is able to be kept operable. Yet another object is to provide a simple device with few moving parts.

Further objects and advanatges of the instant invention will become apparent from the study of the following portion of the specification, the claims and the attached drawings.

BRIEF DESCRIPTION OF THE DRAWINGS

FIG. 4a is a cross-sectional view of the alternate locking collar assembly with disks in place, taken along line 4a—4a of FIG. 3a;

DESCRIPTION OF THE PREFFERRED AND ALTERNATE EMBODIMENTS

Figure 1A:
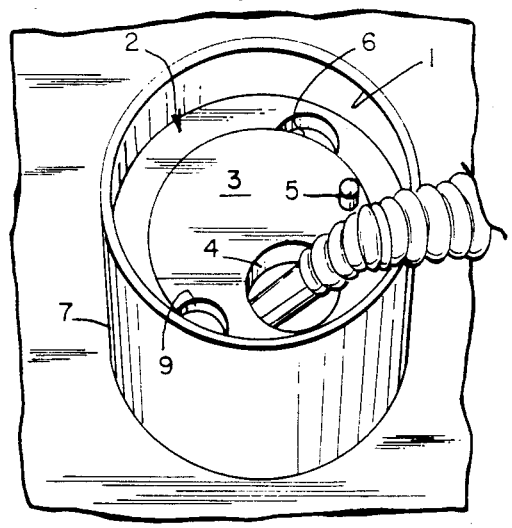
FIG. 1A is a perspective view of the present invention installed in a tank filler tube, showing both off-center openings aligned and ready for filling.
Figure 1B:
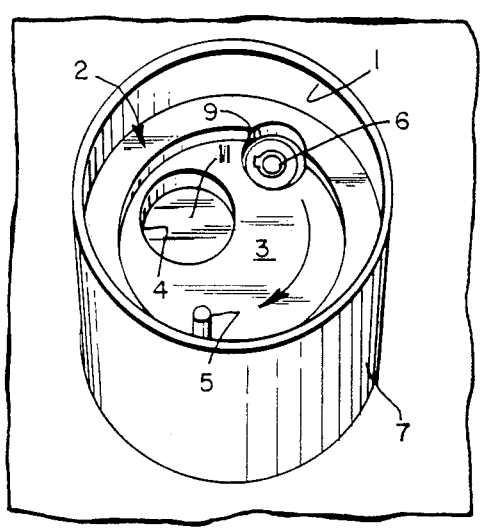
FIG. 1B is a perspective view of the present invention installed in a tank filler tube, showing the off-center openings mis-aligned and the lock closed.

Referring particularly to the drawings, there is shown in FIGS. 1A and 1B, a preferred embodiment of the present invention 2 installed in a tank filler tube 7. In FIG. 1A, the device 2 is shown in the 'open' configuration. That is to say, its off-center opening 4 is aligned with the opening below it and the lock is ready for insertion of a filler hose nozzle in its opening 4. In order to achieve this state, it was necessary to insert a key in the locking element 6, push it down and, using the projecting pin 5 as a knob, rotate the upper disk 3 until the off-center opening 4 as aligned with a similar opening in the disk below (not shown).

In FIG. 1B, the device 2 is shown on the 'closed' configuration. Here, the upper disk 3 has been rotated until the locking element 6 has snapped up, occupying a cutout in the edge of the disk 3 and preventing its further rotation. The disk off-center opening 4 which acts as a filler hole when open, is now mis-aligned with the opening in the disk below it, effectively blocking entry of the filler nozzle.

Figure 2:
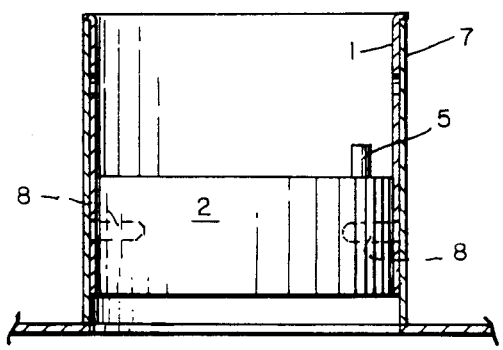
FIG. 2 is a partial cross-section of a tank filler tube, particularly showing the relationship of the filler tube, and the sleeve means and locking collar assembly of the present invention.

A partial cross-section of the device 2 in place in the filler tube is illustrated in FIG. 2. First, a sleeve means 1 is inserted in the tank filler tube 7 inside until the sleeve 1 end rim hangs up on the top edge of the filler tube 7. This is done to provide a smooth sealable surface for the collar lock 2 which is slid inside the sleeve means 1. The collar lock 2 incorporates adjustable threaded projections 8 arranged 120 degrees around its circumference. These projections 8 are tightened in installation to pass through holes in the sleeve means 1 and thence to bear against the inner wall surface of the tank filler tube 7, thus fastening the collar lock 2 and sleeve 1 firmly in place.

Alternatively, the sleeve means 1 may incorporate its own adjustable projections (not illustrated) to bear against the inside wall of the tank filler tube 7. The radial adjustable projections 8 of the collar lock 2 would then bear directly against the inner wall surface of the sleeve means 1. Either assembly approach may be used, depending upon the perceived ease of installation of the locking device. It should be noted from FIG. 2, that the collar lock 2 may be installed near the bottom of the sleeve means 1 or near its top, depending on preference. In either case, it is possible to place a standard removable filler tube cover or cap over the end of the tube after the lock is installed. This would ensure that the lock is kept operable in cold weather.

Figure 4:
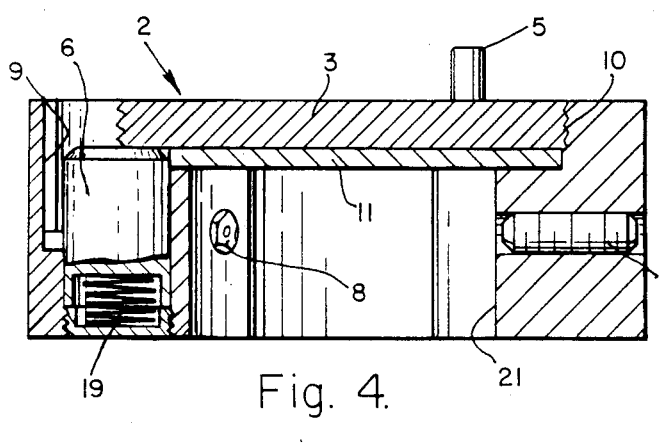
FIG. 4 is a cross-sectional view of the preferred locking collar assembly with disks in place, taken along line 4—4 of FIG. 3.
Figure 3:
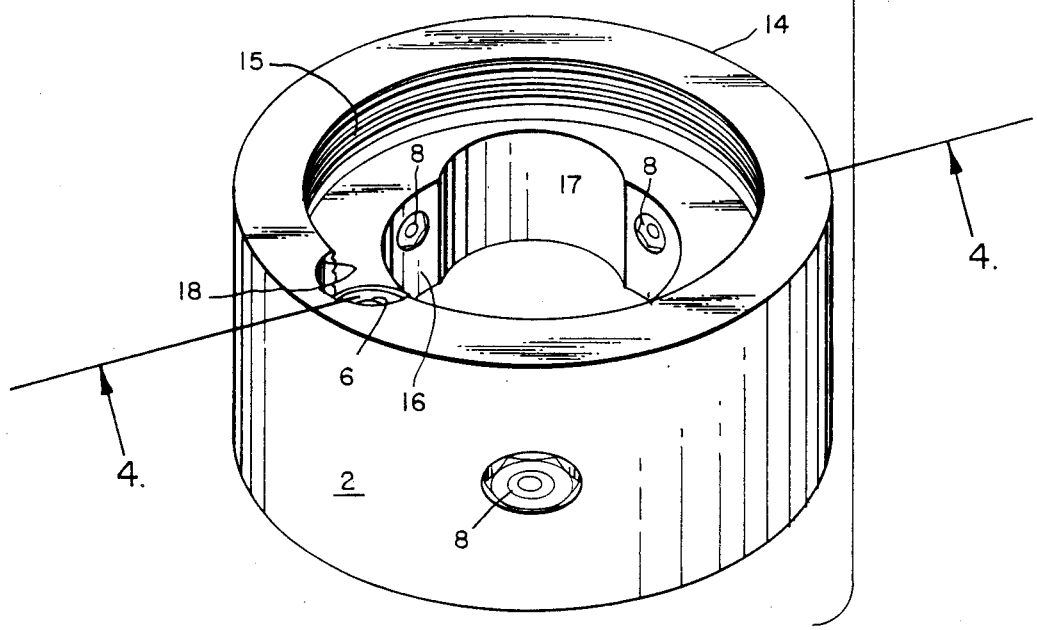
FIG. 3 is an exploded view of the preferred locking collar assembly of the present invention, showing particularly the top first disk member, the sencond disk member located beneath it and an embodiment of the annular collar means which holds both disks in assembly.

Referring now to FIGS. 3 and 4, there is shown an exploded view of the preferred locking collar assembly 2 and a cross-sectional view of the assembly in FIG. 4 taken across section 4—4 of FIG. 3.

The cross-sectional view of FIG. 4 serves to clarify the relationships of the assembled components.

The upper disk 3 or first disk member is an aluminum disk with a threaded or grooved outer cricumference edge 10. A cutout 9 in its circumference is provided for clearance of the locking element 6. Using the cutout 9 as a reference, an off-center opening 4 is located in the disk 3 rotated at an angle α of more than 90 degrees plus half the diameter of the opening 4.

A projecting pin 5 is secured to the disk surface in any convenient location to serve as a knob for rotating the disk 63 when it is assembled in place. Below the first disk member 3 is located the second disk member 11. This disk 11 remains in one position only when assembled and is prevented from rotation by the locking element 6. The disk 11 functions only to provide a fixed off-center opening with which the opening 4 in the first disk member 3 can be aligned. The second disk 11 is made of aluminum and incorporates a cutout 13 in its circumference edge. An off-center opening 12 is located at an angle β which is rotated from the reference cutout 13 less than 90 degree minus half the diameter of the off-center opening 12. This ensures that when both the cutouts 9 and 13 in the first and second disks are occupied by the locking element 6, the off-center openings will be completely mis-aligned.

Referring again to the FIG. 3 exploded view, an annular shaped collar means 14 is illustrated in perspective. This is the main element of the locking collar assembly 2 shown in FIGS. 1A, 1B and 2. The annular collar means 14 has an outside diameter sized to fit closely inside the sleeve means 1. Its outer surface must be smooth to allow a sliding fit while making an effective liquid seal with the sleeve means 1 inner wall. The inside diameter of the collar means 14 is stepped to form two inner diameter surfaces 15 and 16, providing a horizontal retaining surface or ledge on which the second disk member 11 rests. The upper inside diameter 15 is necessarily sized to fit the outside diameter of the first disk member 3 and second disk member 11. A portion of the upper inside diameter surface 15 adjacent to the top surface of the collar means 14 is threaded to engage with the threaded circumference edge 10 of the first disk member, permitting the first disk member to be retained and capable of rotation. Alternately, if the first disk member 3 circumference edge 10 is grrooved instead of being threaded, one or more pins are fastened to and protrude radially from the upper inside diameter surface 15 of the collar means 14, in order to be able to engage with the groove cut in the first disk member 3 circumference edge and thereby retain the disk in place.

Since the openings 4 and 12 in the first and second disks are off-center, for most collar means 14 sizes it will be necessary to provide a cutout 17 shown in the lower inside diameter surface, to allow clearance for the filler hose nozzle when it is inserted through the aligned openings.

A lock hole 18 is bored axially through the collar 14 to provide accommodation for the locking element 6. The lock hole 18 is located so that the locking element 6 will extend normally through the outsde edges of the first and second disk members 3 and 11, preventing the disks from being rotated. Located in the bottom of the locking element 6 is a spring 19 which is retained in the locking element housing. This spring bears upwards against the cylinder lock, forcing it upwards. In the FIG. 4 cross-section illustration, the top disk member 3 is shown rotated to the open position as in FIG. 1a. In this case, the locking element 6 is held down by the first disk member 3, allowing the disk member to be rotated.

The cylindrical locking element 6 incorporates a springloaded projection perpendicular to its axis, which catches in a groove cut in the lock hole 18 wall, preventing further upward or downward movement of the lock. In order to rotate the first disk member 3, it is necessary to unlock the locking element and push it downwards to the level of the second disk 11. This is done by inserting the lock cylinder key and rotating it to cause withdrawal of the spring-loaded projection from the lock hole groove. When the upper first disk member 3 is rotated back to its locked position, and the off-center openings 4 and 12 are misaligned, the cylindrical lock element 6 is allowed to snap up through its clearance cutout 9 in the upper first disk member 3 and lock firmly in position.

Finally, three or more holes are bored and tapped radially through the collar means 14, and located equidistantly apart to accommodate setscrews 8 which can be adjusted to project through the collar means 14 and bear against the wall of the sleeve means 1 or tank filler tube 7.

The preferred locking collar assembly described earlier may be mechanized in an alternate form. An exploded view of this alternate form is given in FIG. 3a and a cross-section view of the alternate locking collar assembly is shown in FIG. 4a. This alternate configuration differs from the preferred configuration in one major way; the upper disk member is secured to the lower disk member at its center by a threaded screw instead of being secured to the annular collar means around the disk circumference. The upper disk circumference edge is thus freed from need for a space allowance for threading or grooves as is the inside surface of the annular collar.

As a result, for any given locking collar assembly outside diameter (or inside sleeve diameter), the alternate upper disk member 40 can have a greater diameter than the preferred upper or first disk member 3, allowing a larger diameter opening for the filler nozzle to be fitted on the disk member.

Figure 3A:
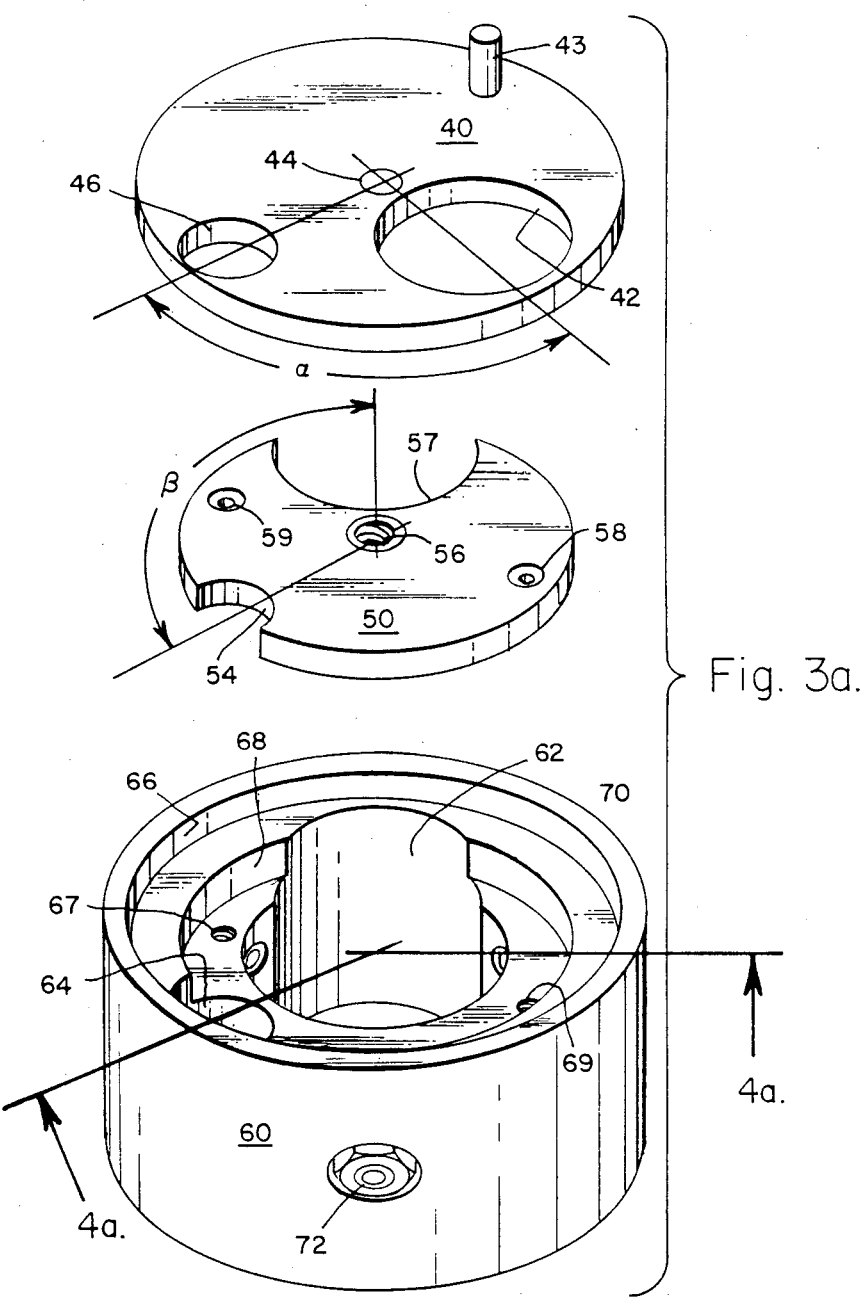
FIG. 3a is an exploded view of an alternate embodiment of the locking collar assembly, showing particularly the top disk member which screws into the second disk member below it, and the annular collar means to which the second disk member is fastened.
Figure 4A:
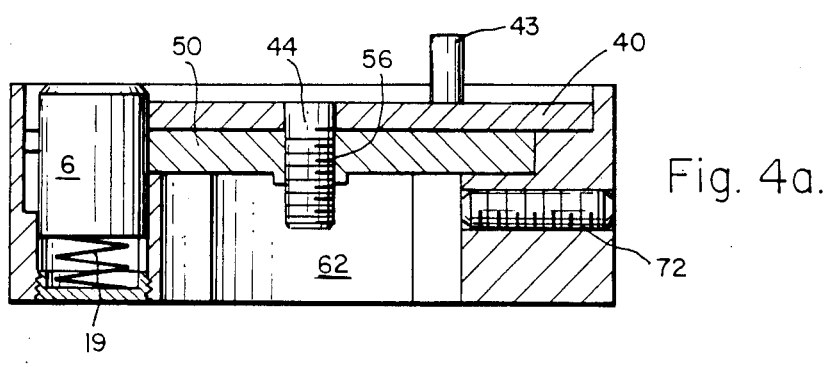

Refer now to FIGS. 3a and 4a. The upper disk 40 or first disk member is an aluminum disk. A first opening 46 near its circumference is provded for clearance of the locking element 6. Using this first opening 46 as a reference, a second off-center opening 42 is located in the disk member 40 rotated counter-clockwise at an angle $\alpha$ of approximately 90 degrees. A screw member 44 is welded to the center of the disk member 40 and projects downward perpendicular to the disk surface. In the FIG. 4a cross-section view, the screw member 44 is shown matng with the threaded opening 56 in the center of the second disk member 50. The upper or first disk member 40 is thus able to be fastened to, and rotated about the second disk member 50.

A projecting pin 43 is secured to the first disk member surface in any convenient location to serve as a knob for rotating the disk 40 when it is assembled in place. Below the first disk member 40 is located the second disk member. This disk member 50 remains in one position only when assembled. It is screwed down to the annular collar means 60 by two screws which are inserted through countersunk holes 58, 59 in its surface and into tapped holes 67 and 69, in the annular collar.

The second disk member 50 function also to provide a fixed off-center cutout 57 with which the opening 42 in the first disk member 40 can be aligned. A first cutout 54 in its circumference edge is located and sized for clearance of the locking element 6. A second, larger cutout 57 is located at an angle $\beta$ which is rotated clockwise from the reference lock cutout 54 by approximately 100 degrees. This ensures that when both the reference lock element openings 46 and 54 in the first and second disks are occupied by the locking element 6, the off-center openings will be completely misaligned.

Referring to the annular collar means 60 depicted in FIG. 3a, a vertical cutout 62 is provide in the inside diameter of the collar means at an angle from the locking element cutout 64. This cutout 62 in the collar 60, lines up with the large cutout 57 in the second disk member 50 to form an opening matching the size of the opening 42 in the top first disk member 40 when it is aligned, allowing clearance for a filler hose nozzle. The locking element 6 fits into its cutout 64 in the annular collar means 60, and is exactly as described earlier for use with the preferred locking collar.

Finally, as in the preferred configuration, three or more tapped holes are bored radially and located equidistantly around the collar means 60, to accommodate setscrews 72 which can be adjusted to project through the wall of the collar and bear against the wall of the sleeve means 1 or tank filler tube 7.

Figure 5:
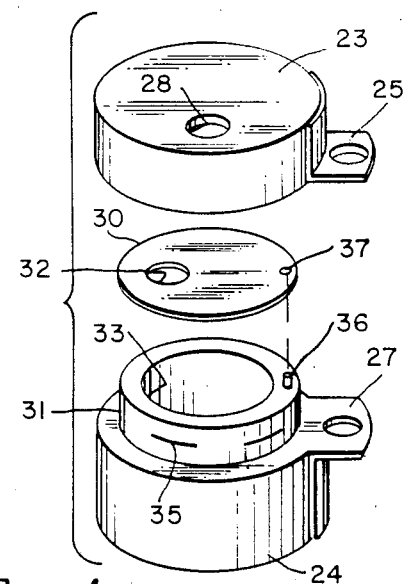
FIG. 5 is an exploded view of an alternate embodiment of the device intended for use with a padlock, particularly showning an annular collar having a stepped upper section, a fixed disk member with its off-center opening and a rotatable cap member with its off-center opening.
Figure 6:
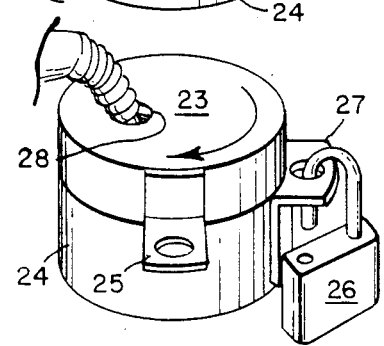
FIG. 6 is a front perspective view of the alternate embodiment of the present invention, showing the device in its open configuration with its off-center openings aligned for filling.

Referring now to FIGS. 5 and 6, there are shown an exploded view and an assembled view of an alternate embodiment of the present invention, intended for use with an externally attached padlock rather than for insertion into a tank filler tube. The device is designed and sized to be either welded to a tank filler tube, or threaded to it.

Referring to FIG. 5, it is seen that the device is comprised of three parts plus a padlock or similar locking means. The three parts are the cap member 23, a disk member 30 and an annular shaped collar 24. The annular collar 24 is formed of two stepped cylindrical sections of different diameters joined axially together. This may be formed or machined in one piece. Its upper section 31 has a smaller outside diameter than its lower section. Its inside diameter surface 33 is smooth, except for the inclusion of a threaded area near the bottom edge to permit attachment by threading on to a tank filler tune or egress tube.

Necessary features of the annular collar 24 include a pin projection 36 on its top surface for locating the disk member first hole 37, and an attached projecting tab 27 with an opening cut in it to accommodate a padlock bar and serve as locking means for the collar 24. The upper section 31 of the collar 24 may have a threaded outer surface 35 for engaging the cap member 23, or may incorporate a horizontal groove around its circumference to engage with a pin that is fixed and radially projecting inward from the inside diameter of the cap member 23.

The disk member 30 is sized to fit on top of the upper section 31 of the annular collar 24 with no overlapping. A first hole 37 is provided for location and fastening the disk member 30 in place on top of the annular collar 24. An off-center opening 32 large enough to accommodate a filler nozzle, is located on the disk member 30 at a position arbitrarily selected as being approximately 180 degrees rotated from the first hole 37, which is used as a reference.

The cap member 23 is cylindrically shaped, with one surface closing the cylinder and forming a head or cap. Its inside diameter surface is sized to fit the outside diameter upper section of the annular collar 31 and is threaded to engage with the collar 31. Alternatively, the cap member 23 inside diameter surface may incorporate radially projecting pins to engage a groove in the collar neck.

An outward projecting tab 25 is welded or fastened by other means to the outside diameter surface of the cap member; the tab 25 having an opening cut in it to accommodate a padlock bar and serve as a locking means for the cap member 23, which is locked to the annular collar 31.

An off-center opening 28 large enough to accept a filler hose nozzle, is located in the head surface of the cap member 23. The opening 28 is located so that, when the cap member 23 is attached to the annular collar 31 with the disk member 30 in place, and rotated so that both locking tabs 25 and 27 line up, the off-center opening 28 will be misaligned with the off-center opening 32 in the disk member 30, producing a 'closed' device configuration.

FIG. 6 shows the 'open' device configuration, with the padlock 26 unlocked and the cap member 23 rotated so that the off-center openings in the cap and disk members are aligned and a hose filler nozzle can be inserted.

The alternate device embodiment described above includes the same basic principles as the preferred embodiment, except that it is simpler in construction. It is intended for application to tanks and containers having filler neck tubes generally much smaller than those found on large diesel trucks.

Various changes and modifications may be made in the construction and mode of operation of the locking devices described above. These changes, which are in accord with the spirit of this invention, are considered to be within the scope of the appended claims and are embraced thereby.

What is claimed is:

1. In combination with a tank filler tube, a locking device comprising:
   sleeve means for insertion in said tank filler tube, and defining a tube inside wall to provide slidable sealing engagement with said tube inside wall;
   annular collar means, sized for slidable insertion into said sleeve means; said annular collar means having a threaded portion of its inside diameter surface located adjacent to its top surface; said inside diameter surface being stepped to a smaller diameter below said threaded portion, providing a retaining surface; said annular collar means having a first hole bored axially adjacent to said inside diameter edge for the purpose of accommodating a locking element;
   a first disk member, having a threaded circumferenced edge and sized to fit the inside diameter of said annular collar means; said first disk member containing an off-center located opening which is large enough to accept a filler hose nozzle;
   a second disk member which is sized to fit the inside diameter of said annular collar means, and being located beneath said first disk member, resting upon said stepped retaining surface; said second disk member containing an off-center located opening which is large enough to accept a filler hose nozzle; and
   a locking element, including a cylindrical lock, which is located in said first hole bored through said annular collar means, and normally, in its locking position, extending through the inside edge of said annular collar means and through the outside edges of said first disk member and second disk member to prevent rotation of said disks about their axis; said cylindrical lock, when unlocked by insertion and rotation of a key, able to be pushed downwards to an unlocked position;
   said off-center openings in each said disk capable of being aligned in open configuration or misaligned in closed configuration; said locking element being adapted to unlock and thereby disengage for rotation about its axis said first disk, permitting said off-center openings in said disks to become aligned, thus allowing said tank filler tube to be utilized for filling purposes.

2. In a combination with a tank filler tube, a locking device comprising:
   sleeve means for insertion in said tank filler tube, and defining a tube inside wall to provide slidable sealing engagement with said tube inside wall;
   annular collar means, sized for slidable insertion into said sleeve means, and containing adjustable, radially projecting members for bearing and securing against the inside wall of said sleeve means; said annular collar means having its inside diameter surface stepped in two levels, an upper and a lower level, to provide retaining surfaces for two disk members; said lower level stepped to a smaller diameter below said upper level; said annular collar means having a lock hole bored axially adjacent to said inside diameter edge for purpose of accommodating a locking element;
   a first disk member, sized to fit the inside diameter of the upper level of said annular collar means and containing a first off-center opening which is large enough to accept a filler hose nozzle; said first disk member having a threaded screw member fixedly attached at its center and projecting downwards perpendicular to the plane of the disk;
   a second disk member which is sized to fit the inside diameter of the lower level of said annular collar means; said second disk member containing a threaded hole at its center for receiving the threaded screw member of said first disk member; said second disk member containing a first off-center cutout which can be aligned with said first off-center opening in said first disk member;
   a locking element, including a cylindrical lock, which is located in an axial lock hole bored through said annular collar means, and extending normally through the inside edge of said annular collar means and through an opening in said first disk member and in said second disk member to prevent rotation of said disks about their axis; said cylindrical lock, when unlocked by insertion and rotation of a key, able to be pushed downwards to an unlocked position;
   said off-center openings in each said disk capable of being aligned in open configuration or misaligned in closed configuration; said locking element being adapted to unlock and thereby disengage for rotation about its axis said first disk, permitting said off-center openings in said disks to become aligned, thus allowing said tank filler tube to be utilized for filling purposes.

3. The locking device of claim 1 wherein:
   said annular collar means incorporates a multiplicity of set screws and their threaded holes bored radially and separated equidistantly around its circumference; said set screws for the purpose of projecting through said locating holes in said sleeve means and being tightened against the inside wall of said tank filler tube, thereby securing said annular collar means in place.

4. The locking device of claim 1 wherein:
   said first disk member has a cutout in its edge corresponding to the location of said locking element when said first disk member is assembled in said annular collar means; said cutout necessary for clearance of the locking element when said disk member is in its locking position; said off-center opening for the filler hose nozzle being located, rotated at an angle α of more than 90 degrees plus at least half the diameter of said off-center opening, with respect to said cutout; said first disk member having a projection pin, welded or otherwise fastened to its surface, projecting upwards and serving as a knob for rotating said first disk member in said annular collar.

5. The locking device of claim 1 wherein:
   said first disk member has a grooved circumferenced edge and is sized to fit the inside diameter of said annular collar means.

6. The locking device of claim 1 wherein:

said annular collar means has one or more pins embedded in its inside diameter surface, located adjacent to its top surface, and projecting radially for the purpose of engaging the grooved circumferenced edge of said first disk member and holding it in place.

7. The locking device of claim 1 wherein:

said second disk member has a cutout in its edge corresponding to the location of said locking element when said second disk member is assembled into said annular collar means; said cutout for the purpose of providing clearance for said locking element and preventing rotation of said second disk member; said off-center opening for the filler hose nozzle being located, rotated at an angle of less than 90 degrees minus half the diameter of said off-center opening with reference to said cutout location, so as to produce blocking of said off-center opening when said first disk member is rotated into its locking position.

8. The locking device of claim 1 wherein:

said locking element includes a spring which is located in its base and is retained therein, constantly exerting upward pressure against the base of said cylindrical lock so as to force said lock upwards to a locking position; said cylindrical lock including a spring-loaded projection perpendicular to its axis which, in the locking position, catches in a groove in said lock hole, preventing downward movement of said cylindrical lock unless the lock key is inserted and rotated to withdraw said projection from said groove.

9. the locking device of claim 2 wherein:

said first disk member has a second opening near its edge which is sized to accommodate said locking element when said first disk member is assembled in said annular collar means; said second opening serving as a reference for the location of said first opening which is rotated counter-clockwise at an angle $\alpha$ of approximately 90 degrees from said second opening; said first disk member having a pin, welded or otherwise fastened to its surface, projecting upwards and serving as a knob for rotating said first disk member in said annular collar;

10. The locking device of claim 2 wherein:

said second disk member has a second cutout in its edge, corresponding to the location of said locking element when said second disk member is assembled into said annular collar means; said second cutout for the purpose of providing clearance for said locking element; said first off-center cutout being sized to accommodate approximately half the diameter of a filler hose nozzle, and being located rotated clockwise at an angle $\beta$ of more than 90 degrees with reference to said second cutout location in order to produce blocking of said first off-center cutout when said first disk member is rotated into its locking position.

11. The locking device of claim 2 wherein:

said second disk member has two or more countersunk holes bored near its edges and normal to the disk plane, to accommodate screws which are used to fasten it to said annular collar means.

12. The locking device of claim 2 wherein:

said annular collar means has a vertical cutout in its inside diameter surface, sized and shaped to accommodate approximately half the diameter of a filler hose nozzle; said vertical cutout, together with said first off-center cutout in said second disk member, providing clearance for a filler hose nozzle; said annular collar including two or more tapped holes in its inside surface stepped lower level for fastening said second disk member to it, using screws.

13. The locking device of claim 2 wherein:

said locking element includes a spring which is located in its base and is retained therein, constantly exerting upward pressure against the base of said cylindrical lock so as to force said lock upwards to a locking position; said cylindrical lock including a spring-loaded projection perpendicular to its axis which, in the locking position, catches in a groove in said lock hole, preventing downward movement of said cylindrical lock unless the lock key is inserted and rotated to withdraw said projection from said groove.

14. In combination with a tank filler tube, drain pipe or other fluid egress means, a locking device comprising:

an annular collar, formed of two cylindrical sections joined axially together: an upper section having a threaded outside diameter and a lower section having an outside diameter greater than the upper section; said annular collar including, attached to its lower section outer circumference, a means for locking in place; said upper section having a pin projection located on its upper annular surface; said lower section having a threaded inside diameter surface to permit attachment by this means to said tank filler tube or other tube projection;

a disk member, having an off-center opening in its surface; said opening of a size large enough to accept a filler hose nozzle; said disk member having a first hole located near its circumferential edge, said hole sized to accept said pin projection on top of said annular collar; said disk member, when placed on top of said annular collar, being held in place and prevented from rotation;

a cap member, having a cylindrical shape with one surface forming a cylinder head; said cylinder head having an off-center hole bored in its surface and of a size large enough to accept a filler hose nozzle; said cap member having its inside diameter surface sized to fit the upper section of said annular collar and threaded to permit fastening to it; said cap member having attached to its outside circumference surface, means for locking in place which are the same as said locking means attached to said annular collar;

said cap member, having its off-center opening located such that when said cap member is assembled with said disk member on said annular collar, and rotatably coupled so as to match locking means position with said annular collar locking means; the assembly off-center openings are misaligned in closed configuration, preventing use of the device for filling or emptying.

15. The locking device of claim 14 wherein:

said locking mean attached to said annular collar includes an outward projecting tab which is welded or fastened by other means to the outside cylindrical surface of said annular collar; said projecting tab having an opening cut in it sized to received a padlock bar for locking.

16. The locking device of claim 14 wherein:

said locking means attached to said cap member includes an outward projecting tab which is welded or fastened by other means to the outside cylindrical surface of said cap member; said projecting tab having an opening cut in it sized to received a padlock bar for locking.

* * * * *